(12) United States Patent
Baudelet

(10) Patent No.: US 11,440,371 B2
(45) Date of Patent: Sep. 13, 2022

(54) BEARING FOR STABILIZER BAR PROVIDED WITH A BACKING PLATE

(71) Applicant: SOGEFI SUSPENSIONS, Guyancourt (FR)

(72) Inventor: Jacques Baudelet, Vitry en Artois (FR)

(*) Notice: Subject to any disclaimer, the term of this patent is extended or adjusted under 35 U.S.C. 154(b) by 0 days.

(21) Appl. No.: 16/635,624

(22) PCT Filed: Aug. 1, 2018

(86) PCT No.: PCT/FR2018/051978
§ 371 (c)(1),
(2) Date: Jan. 31, 2020

(87) PCT Pub. No.: WO2019/025727
PCT Pub. Date: Feb. 7, 2019

(65) Prior Publication Data
US 2021/0122207 A1    Apr. 29, 2021

(30) Foreign Application Priority Data

Aug. 2, 2017 (FR) ...................................... 17 57423

(51) Int. Cl.
*B60G 21/055* (2006.01)
*F16F 1/38* (2006.01)

(52) U.S. Cl.
CPC ........ *B60G 21/0551* (2013.01); *F16F 1/3842* (2013.01); *B60G 2204/1222* (2013.01);
(Continued)

(58) Field of Classification Search
CPC ............ B60G 21/0551; B60G 2204/41; B60G 2206/427; B60G 2204/1222;
(Continued)

(56) References Cited

U.S. PATENT DOCUMENTS 6,007,058 A * 12/1999 Kokubo ................ F16B 17/008
248/634
8,505,940 B1 * 8/2013 Hufnagle ........... B60G 21/0551
280/124.13
(Continued)

FOREIGN PATENT DOCUMENTS

CN           203344686 U    12/2013
DE       102012208156 A1    11/2013
(Continued)

OTHER PUBLICATIONS

English language abstract of DE 102014217839.
(Continued)

*Primary Examiner* — Jonathan Ng
*Assistant Examiner* — Daniel M. Keck
(74) *Attorney, Agent, or Firm* — Robert Facey

(57) ABSTRACT

A bearing for a stabilizer bar of a vehicle comprising a flange including at least one retaining portion, provided with a fastening bore, and one groove, configured to receive the stabilizer bar, and a backplate including at least one obturation portion, the backplate being provided to be mounted on the flange so that the obturation portion closes the groove of the flange, wherein the flange and the backplate have elastic nesting members configured to secure the backplate on the flange.

13 Claims, 3 Drawing Sheets

(52) U.S. Cl.
CPC .... *B60G 2204/41* (2013.01); *B60G 2206/427* (2013.01); *B60G 2206/71043* (2013.01); *B60G 2206/73* (2013.01)

(58) Field of Classification Search
CPC .... B60G 2206/7102; B60G 2206/7104; B60G 2206/71043; B60G 2206/73; F16F 1/3842
See application file for complete search history.

(56) References Cited

U.S. PATENT DOCUMENTS

| | | | |
|---|---|---|---|
| 2012/0097827 A1 | 4/2012 | Klink et al. | |
| 2015/0239319 A1* | 8/2015 | Kuroda | B60G 21/0551 156/581 |
| 2017/0151853 A1* | 6/2017 | Saiki | B60G 21/0551 |
| 2017/0282447 A1* | 10/2017 | Suzuki | B29C 66/742 |
| 2018/0266509 A1* | 9/2018 | Wittenbrink | F16F 9/54 |
| 2018/0272828 A1* | 9/2018 | Umeno | B60G 21/0551 |
| 2020/0164714 A1* | 5/2020 | Tsunekawa | B60G 21/0551 |
| 2020/0376917 A1* | 12/2020 | Ditzel | B60G 21/0551 |

FOREIGN PATENT DOCUMENTS

| | | | |
|---|---|---|---|
| DE | 202016100149 U1 | 2/2016 | |
| DE | 102014217839 A1 | 3/2016 | |
| EP | 3326846 A1 | 5/2018 | |
| FR | 2994129 A1 | 2/2014 | |
| WO | 2010/149756 A1 | 12/2010 | |
| WO | WO-2015088459 A1 * | 6/2015 | ......... B60G 21/0551 |
| WO | 2017/216247 A1 | 12/2017 | |

OTHER PUBLICATIONS

English language abstract of DE 202016100149.
English language abstract of FR 2994129.
English language abstract of CN 203344686.
English language abstract of DE 102012208156.
English language abstract of WO 2017/216247.

* cited by examiner

BEARING FOR STABILIZER BAR PROVIDED WITH A BACKING PLATE

FIELD

The present disclosure relates to a bearing for a stabilizer bar of a vehicle.

Such a bearing may be used to mount any type of stabilizer bar on the chassis of any type of vehicle, in order to limit the roll of the vehicle. Particularly, such a bearing may be used to mount the stabilizer bar for any axle of the vehicle.

BACKGROUND

In a vehicle with axles, the two wheels on the same axle are generally connected by a stabilizer bar. Such a stabilizer bar, also called an anti-sway or anti-roll bar, is a suspension element of the vehicle that forms a spring tending to secure the two wheels of the same axle. Such a stabilizer bar thus makes it possible to limit the roll during turns and reduce the deformations undergone by the suspension so as to keep the tires flat on the ground as much as possible and therefore maintain maximum grip.

Each end of a stabilizer bar is thus fastened to the wishbone of a wheel, by means of ball-joint tie rods, while the central portion of the stabilizer bar is fastened to the chassis of the vehicle by means of at least two bearings.

These bearings must allow the fastening of the stabilizer bar on the chassis of the vehicle while ensuring a certain flexibility, the stabilizer bar being able to slightly move relative to the chassis.

For this reason, the bearings conventionally comprise a metal flange and an elastic ring interposed between the stabilizer bar and the metal flange. This elastic ring, most often made of elastomer, is thus generally placed around the stabilizer bar and then clamped by the flange that then blocks it by compression.

In some configurations, the bearing further comprises a backplate mounted on the metal flange to close the latter and thus enclose the elastic ring and the stabilizer bar.

However, such backplates, which are generally metallic, add mass to the stabilizer unit, which is not desired by automobile manufacturers.

Furthermore, they complicate the assembly of the stabilizer unit since they require either correctly keeping them in position relative to the flange during the fastening of the bearing on the chassis of the vehicle, or fastening them on the flange during an additional, typically crimping, step implementing complex and expensive additional tools.

There is therefore a real need for a bearing for a stabilizer bar of a vehicle, which is devoid, at least partly, of the drawbacks inherent in the aforementioned known configurations.

SUMMARY

The present disclosure relates to a bearing for a stabilizer bar of a vehicle, including a flange including at least one retaining portion and one groove, configured to receive the stabilizer bar, and a backplate including at least one obturation portion, the backplate being provided to be mounted on the flange so that the obturation portion closes the groove of the flange, in which the flange and the backplate have elastic nesting members configured to secure the backplate on the flange.

In the present disclosure, it is meant by "elastic nesting" (also frequently called snapping or clipping) a mode for assembling two portions by elastic engagement and deformation (in general local deformation of only one portion of a part, for example a tab, or of a peripheral element of said part, or by deformation of all the parts involved in the assembly). When the two portions are engaged in the nesting position, the portions have generally recovered their initial shape and no longer have elastic deformation (or smaller elastic deformation). When the two portions are engaged with each other in the nesting position, they cooperate with each other so as to oppose or even block the relative movements of said portions in the direction of the disengagement (opposite direction to the direction of the engagement). In the nesting position, the two portions may also cooperate so as to oppose, or even block, their relative movements in the direction of extension of the engagement, beyond the nesting position.

Thus, thanks to the use of elastic nesting members, it is possible to provide the bearing with a backplate at the expense of a very reduced additional force, the assembly of the backplate on the flange being very fast, very easy. In addition, depending on the size of the bearing and on the desired resistance of the assembly, it is possible to dimension these elastic nesting members so that the assembly requires no additional tool or, at least, no other tooling than a simple press.

In addition, once assembled in this manner, the bearing may be handled as a whole, without having to maintain some of its parts with each other, which greatly facilitates its handling and fastening on the chassis of the vehicle. The difficulty of work for the operators is also reduced.

In some embodiments, the elastic nesting members are irreversible. By "irreversible" is meant that it is not possible to disassemble the two parts under normal conditions of use, without specific tools in particular, and without damaging at least one of the parts. This ensures a robust assembly of the bearing, the backplate being unlikely to be detached unexpectedly.

In some embodiments, the elastic nesting members comprise at least one elastic tab and one corresponding shoulder, the elastic tab being configured to be engaged and retained behind the corresponding shoulder. Such a configuration is particularly easy to manufacture and to use during the assembly of the bearing.

In some embodiments, at least one elastic tab of the elastic nesting members extends from a retaining portion of the flange.

In some embodiments, at least one shoulder of the elastic nesting members is provided in an assembly portion of the backplate. The backplate is thus more compact; particularly, the backplate may have a shape of a plate with planar surfaces, with no protrusion of elements.

In some embodiments, the elastic nesting members are configured to allow a clearance between the backplate and the flange. For example, each elastic tab has a length greater than the distance separating its base from the corresponding shoulder. When an elastomer layer is present in the groove of the flange, this makes it possible to adjust the compression of this elastomer layer and, thus, to regulate the adhesion between the bearing and the stabilizer bar.

In some embodiments, the backplate is free to move within this clearance. This makes it possible to limit the force on the backplate during transport before mounting on the vehicle while leaving the possibility of reducing or cancel this clearance, and therefore increase the compression of the elastomer layer, at the moment of the assembly on the vehicle by screwing the unit on the vehicle body.

In some embodiments, this clearance is comprised between 1 and 3 mm. Typically, this allows obtaining a compression of the elastomer layer of 30 to 80%, the elastomer layer being considered as 100% compressed when the backplate is in abutment against the flange, that is to say when no clearance separates the backplate from the flange.

In some embodiments, the flange and the backplate have positioning members configured to position the backplate relative to the flange. These positioning members are distinct from the elastic nesting members. They allow facilitating the positioning of the backplate relative to the flange and guiding the backplate during its assembly on the flange: this assembly is thus easier and faster.

In some embodiments, the positioning members comprise at least one projection and a corresponding cutout, the projection being configured to be engaged in the corresponding cutout.

In some embodiments, at least one projection of the positioning members extends from a retaining portion of the flange.

In some embodiments, at least one cutout of the positioning members is provided in an assembly portion of the backplate. The backplate is thus more compact; particularly, the backplate may have the shape of a plate with planar surfaces, with no protrusion of elements.

In some embodiments, at least one retaining portion of the flange is provided with a fastening bore. This allows the passage of a screw or a rivet for example with the aim of fastening the bearing on the chassis of the vehicle.

In some embodiments, the flange comprises two retaining tabs, forming retaining portions, framing the groove, and each provided with a fastening bore.

In some embodiments, each retaining tab comprises at least one elastic nesting member, and preferably two elastic nesting members. These elastic nesting members are preferably elastic tabs.

In some embodiments, the backplate comprises an assembly portion provided with a bore coincident with the fastening bore of a retaining portion of the flange.

In some embodiments, the backplate comprises two assembly portions framing the obturation portion and each provided with a bore coincident with the fastening bore of the corresponding retaining tab of the flange.

In some embodiments, each assembly portion comprises at least one elastic nesting member, and preferably two elastic nesting members. These elastic nesting members are preferably shoulders.

In some embodiments, the fastening bore of at least one retaining portion of the flange is provided with a sleeve. This allows strengthening the bore area so that the fastening of the bearing on the chassis of the vehicle does not weaken. This sleeve is preferably metallic.

In some embodiments, the sleeve of one at least of the retaining portions of the flange protrudes from the surface of the retaining portion so as to be engaged in the bore of the corresponding assembly portion of the backplate. Such a sleeve thus constitutes a positioning member.

In some embodiments, the flange and/or the backplate is made of plastic material, aluminum or aluminum alloy.

Thanks to the use of such particularly light materials, it is possible to drastically reduce the mass of the bearing compared to the case of a conventional bearing while keeping equivalent mechanical properties. It is thus possible to obtain a mass gain of at least 40% compared to a metal bearing made of iron or iron alloy for example. Such a reduction in mass allows, on the one hand, a lighter work for the operators and, on the other hand, increased performances for the vehicle.

In some embodiments, the flange is made of thermoplastic material, preferably from polyamide, for example from PA66. This lightweight material gives good mechanical properties. It also offers good adhesion with the elastomer coating. The flange may also be made from polybutylene terephthalate (PBT), in particular.

In the present disclosure, it is meant that a given part is made "from" a particular material when it is composed of at least 50%, preferably at least 80%, more preferably at least 99%, of the considered material.

Similarly, in some embodiments, the backplate is made of thermoplastic material, preferably from polyamide, for example from PA66. The backplate may also be made from polybutylene terephthalate (PBT), in particular.

In some embodiments, the flange is made in a fiber-reinforced material. These fibers allow reinforcing the mechanical strength of the flange.

Similarly, in some embodiments, the backplate is made in a fiber-reinforced material.

In some embodiments, the fibers are glass fibers.

In some embodiments, the fibers are short fibers of length less than 5 mm, preferably comprised between 2.5 and 3.5 mm.

In some embodiments, the diameter of the fibers is comprised between 0.1 and 0.5 mm, preferably comprised between 0.2 and 0.3 mm.

In some embodiments, the fibers are sized.

In some embodiments, the groove of the flange has a U-shape with planar side walls extending from a semi-cylindrical cradle portion. This configuration makes it possible to easily place the stabilizer bar and allows good transmission of the forces exerted on the bar.

In some embodiments, the bearing comprises an elastomer layer provided within the groove of the flange and intended to surround the stabilizer bar.

In the present disclosure, it is meant by "elastomer layer" a layer composed of at least 50%, preferably at least 80%, more preferably at least 99%, of one or several elastomer(s).

In some embodiments, the elastomer layer is made from rubber, preferably vulcanized rubber.

In some embodiments, the elastomer layer is made of thermoplastic material, preferably from polyurethane (PU). This polymer comprises a succession of rigid sequences and flexible sequences, the rigid sequences acting as fixed points or as physical cross-linking points within the matrix composed of the flexible sequences, which makes it possible to obtain physical and chemical properties similar to the chemically vulcanized natural or synthetic rubber: this material thus offers hyper-elasticity equivalent to that of the rubber. This material also offers good abrasion and corrosion resistance and higher temperature resistance than that of the rubber. In addition, unlike the vulcanized rubber, the chemically non-vulcanized thermoplastic elastomers may be easily recycled. The elastomer layer may also be made from polyester or from a thermoplastic polyester-polyurethane, thermoplastic polyether-polyurethane or thermoplastic elastomer-polyester combination, to mention a few examples.

In some embodiments, the elastomer layer comprises an insert. This plastic or metal insert allows adjusting the stiffness of the elastomer layer.

In some embodiments, the elastomer layer occupies the entire volume of the groove left by the stabilizer bar. This, on the one hand, facilitates the manufacture of the elastomer layer and, on the other hand, allows better compression of the stabilizer bar.

In some embodiments, the elastomer layer is bonded within the groove of the flange.

In some embodiments, the elastomer layer is injected into the groove of the flange and cross-linked in place so as to secure the elastomer layer in the groove of the flange.

In some embodiments, the flange and/or the backplate has a cellular structure. Such a cellular structure allows reducing the amount of material used and thus further reducing the mass of the bearing.

In some embodiments, the cells of the flange are parallel and extend along a main direction of the flange orthogonal to the direction of extension of the stabilizer bar. In this manner, the side walls of the cells extend in the main direction of the flange, that is to say the direction of fastening of the bearing and the direction of compression of the stabilizer bar: a better distribution of the stresses is thus obtained.

In some embodiments, at least some walls separating the cells of the flange extend in substantially radial and/or tangential planes with respect to the main axis of the flange. This orientation allows ensuring good mechanical strength of the flange towards the compression forces.

In some embodiments, at least some walls separating the cells of the flange extend in substantially radial and/or tangential planes relative to the axis of a fastening bore of the flange. This orientation makes it possible to ensure good mechanical strength of the flange at this fastening bore, particularly towards the fastening forces.

In some embodiments, each wall separating two cells of the flange extends in a substantially radial plane or a substantially tangential plane with respect to the main axis of the flange or to the axis of a fastening bore of the flange.

In the case of a fiber-reinforced material, it should also be noted that these cells allow orienting the fibers along the walls separating the cells and therefore reinforcing the flange in these same structural planes.

In some embodiments, fillets are provided between each side wall of the cells of the flange. These fillets facilitate the flow of the fluid in the mold during the injection. In the case of a fiber-reinforced material, they also promote the passage of the fibers and their orientation along the walls.

Similarly, in some embodiments, the backplate has a cellular structure.

In some embodiments, the cells of the backplate are parallel and extend along a main direction of the backplate orthogonal to the direction of extension of the stabilizer bar. In this manner, the side walls of the cells extend in the main direction of the backplate, that is to say the direction of insertion of the backplate into the flange and the direction of compression of the stabilizer bar: a better distribution of the stresses is thus obtained.

In some embodiments, at least some walls, and preferably all the walls, separating the cells of the backplate extend in substantially radial and/or tangential planes with respect to the main axis of the backplate.

In some embodiments, fillets are provided between each side wall of the cells of the backplate.

In some embodiments, the bearing further comprises a shim, engaged at least partially in the groove of the flange, including a cradle portion. This shim may in particular correspond wholly or partly to the various embodiments of the shim described in the French patent application no. FR1757406. However, such a shim is in no way necessary and will be preferably omitted.

In a general manner, it should be noted that the teaching of the present disclosure is compatible with that of the French patent applications FR1757406 and FR1757412: particularly, the flanges described in these patent applications may be adapted according to the teachings of the present disclosure to be able to add a backplate thereon according to any one of the preceding embodiments.

The present disclosure also relates to a stabilizer unit for a vehicle, comprising a stabilizer bar, and at least one bearing according to any one of the preceding embodiments, mounted on the stabilizer bar.

In some embodiments, the stabilizer bar is a solid bar or a hollow tube.

In some embodiments, the stabilizer bar is painted.

In other embodiments, the stabilizer bar is devoid of paint.

In some embodiments, the surface tension of the stabilizer bar at the bearing is greater than 60 mN/m, preferably greater than 70 mN/m.

The above characteristics and advantages, as well as others, will become apparent upon reading the following detailed description of exemplary embodiments of the proposed bearing. This detailed description refers to the appended drawings

BRIEF DESCRIPTION OF THE DRAWINGS

The appended drawings are schematic and are primarily intended to illustrate the principles of the disclosure.

In these drawings, from one figure (FIG.) to the other, identical elements (or portions of elements) are identified by the same reference signs.

DETAILED DESCRIPTION

In order to make the disclosure more concrete, one example of a bearing is described in detail below, with reference to the appended drawings. It is recalled that the disclosure is not limited to this example.

Figure 3:
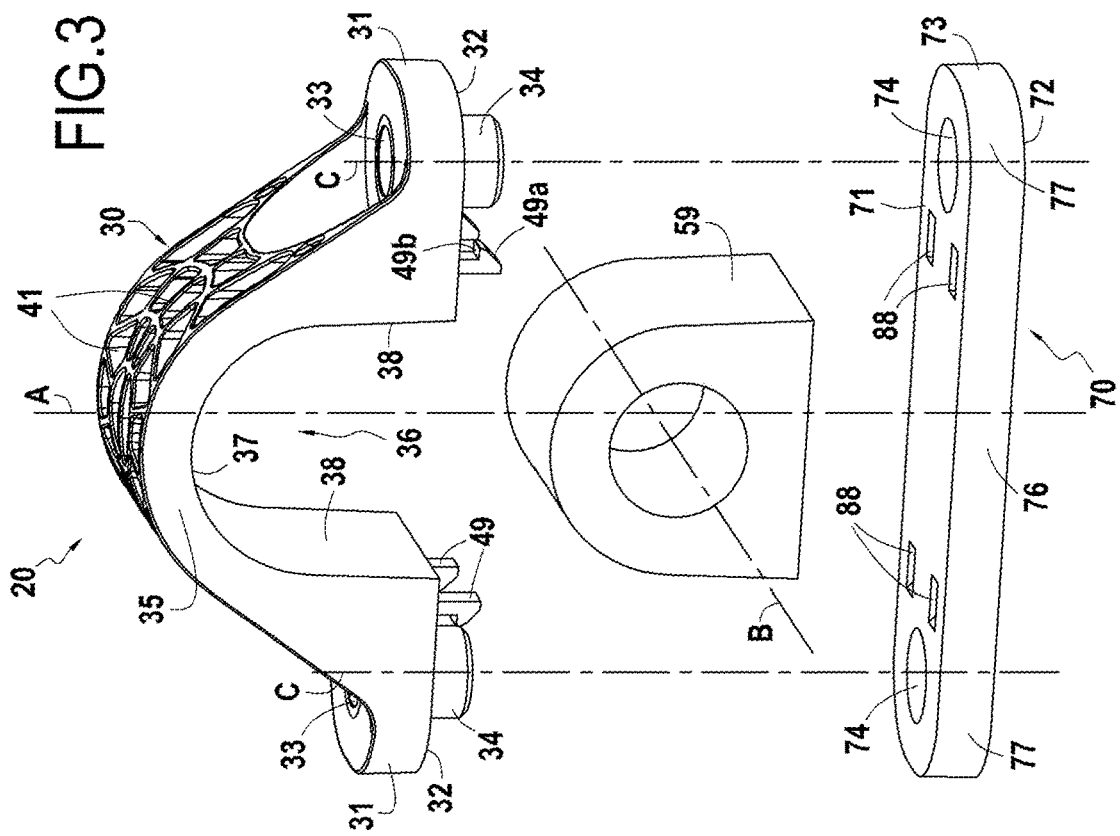
FIG. 3 is an exploded view of the bearing of FIG. 2.
Figure 1:
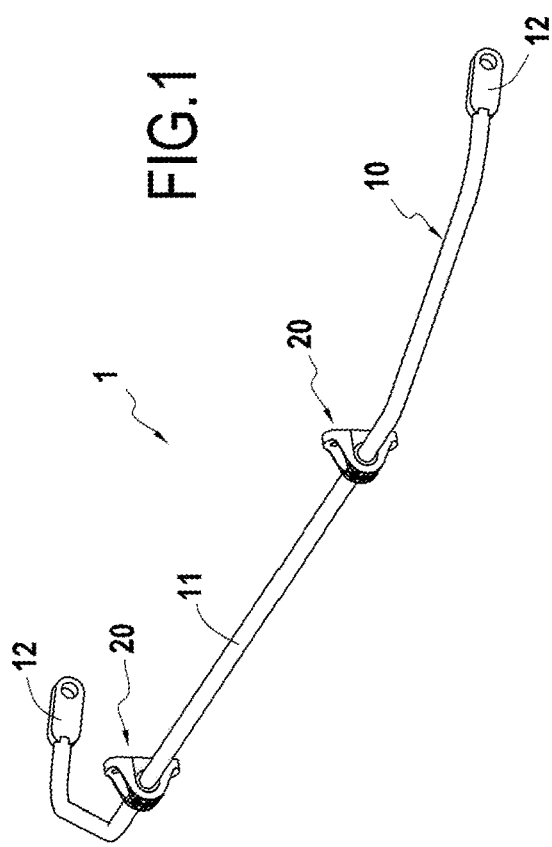
FIG. 1 is a perspective view of a stabilizer unit.
Figure 2:
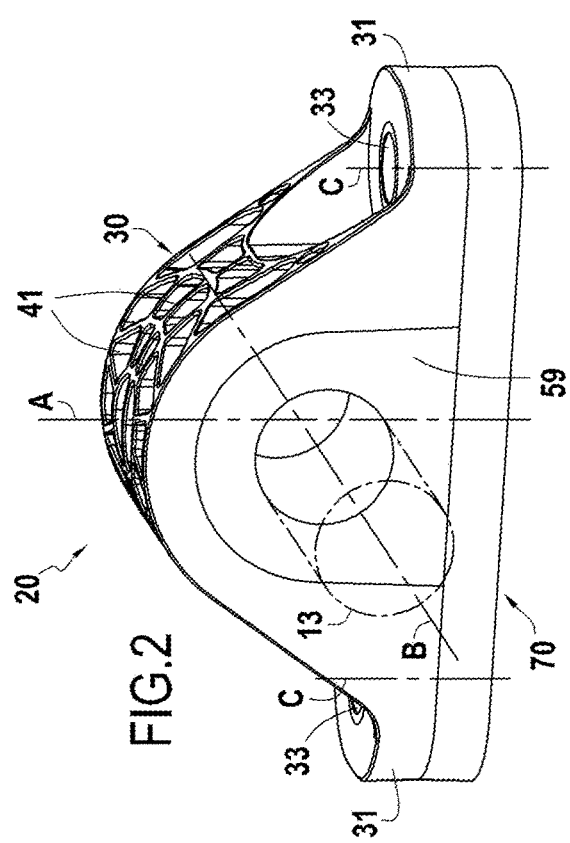
FIG. 2 is a perspective view of one example of a bearing.
Figure 4A:
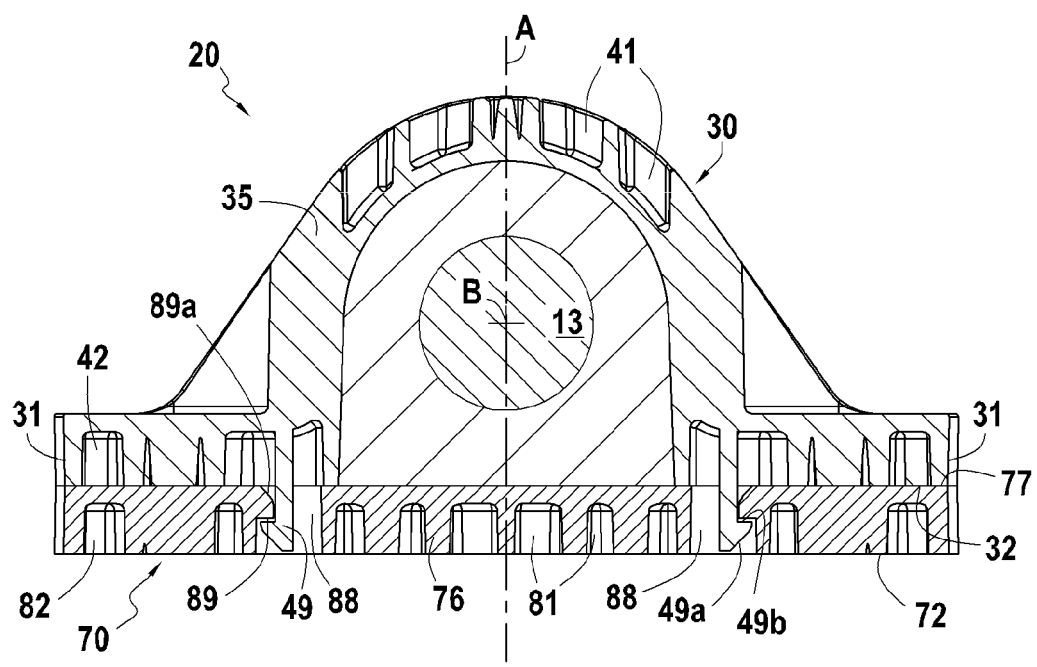
FIG. 4A is an axial sectional view of the bearing of FIG. 2 passing through the elastic tabs.
Figure 4B:
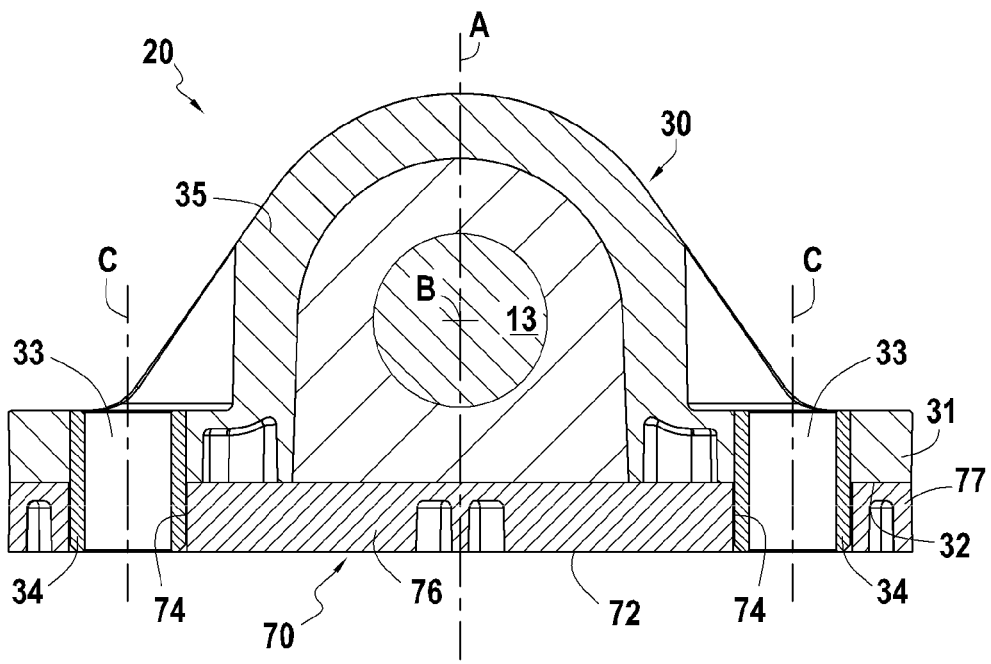
FIG. 4B is an axial section view of the bearing of FIG. 2 passing through the fastening bores.

FIG. 1 represents a stabilizer unit 1 for a vehicle comprising a solid or hollow stabilizer bar 10, painted or not, whose central portion 11 is equipped with two bearings 20. The bearings 20 are intended to be fastened on the chassis of the vehicle while the ends 12 of the stabilizer bar 10 are intended to be fastened on portions of the vehicle that are secured to each wheel of the same axle, particularly the wishbone of each wheel of the axle.

FIGS. 2 to 6 represent such a bearing 20 mounted on a section 13 of the stabilizer bar 10. The bearing 20 comprises a flange 30, a backplate 70 and an elastomer layer 59.

The flange 30 has a general U shape and comprises two retaining tabs 31 connected by an arch 35 so as to form a groove 36. The flange 30 is symmetrical with respect to its main axis A which more broadly constitutes the main axis of the bearing 20.

Each retaining tab 31 extends laterally from the base of the arch 35, perpendicularly to the main axis A. Each retaining tab 31 has an abutment surface 32, forming the abutment surface of the flange 30, and a through bore 33, of axis C perpendicular to the abutment surface 32 and therefore parallel to the main axis A. Each bore 33 is provided with a metal sleeve 34 passing through the retaining tab 31 and protruding on the abutment surface 32 of the flange 30 over a length substantially equal to the thickness of the backplate 70.

Each retaining tab 31 also comprises two elastic tabs 49 extending perpendicularly from the abutment surface 32. The end of the elastic tabs 49 takes the form of a hook with an insertion surface 49a inclined and directed forwards and a blocking surface 49b disposed at right angles and directed rearwards.

The generally U-shaped groove 36, is also symmetrical with respect to the main axis A. It has a semi-cylindrical bottom portion, forming a cradle portion 37, flanked by two planar side walls 38 opening onto the abutment surface 32 of the flange 30. The semi-cylindrical cradle portion 37 is directed along an axis B orthogonal to the axis A and corresponding to the direction of extension of the stabilizer bar 10 when the bearing 20 is mounted.

The flange 30 is made by glass fiber-reinforced polyamide 66 molding and injection. These glass fibers are short fibers with a length comprised between 3 and 3.2 mm for a diameter comprised between 0.2 and 0.25 mm. These fibers are treated by sizing to allow proper wetting of the fibers and then mixed with the polyamide matrix at a level of 30 to 50% by mass of the final material. The metal sleeves 34 are for their part inserted into the mold of the flange 30 before the injection of the thermoplastic material. In some examples, the sleeves 34 may comprise annular reliefs that allow blocking their positions within the flange 30 once the material has solidified.

Figure 5:
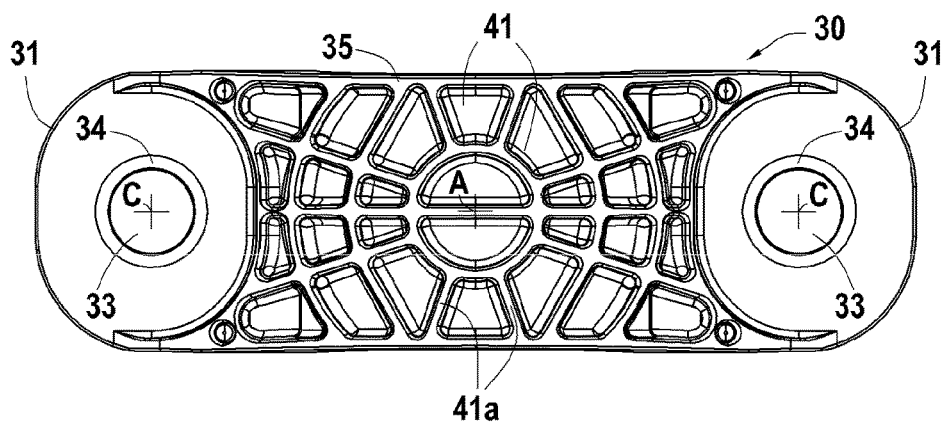
FIG. 5 is a top view of the flange of FIG. 2.
Figure 6:
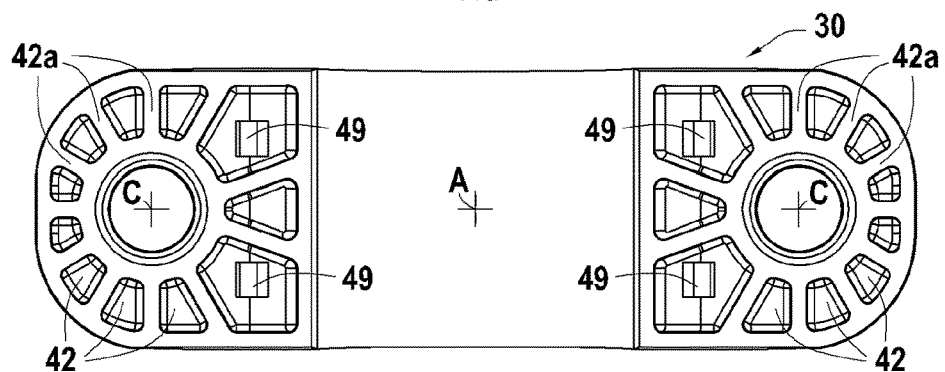
FIG. 6 is a bottom view of the flange of FIG. 2.
Figure 7:
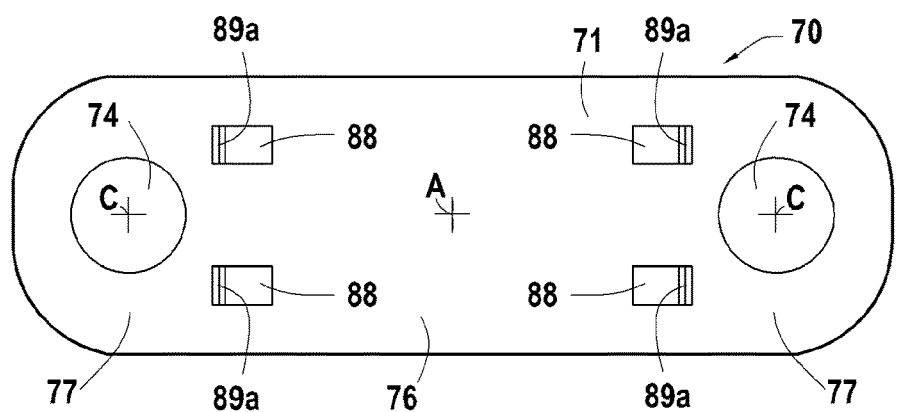
FIG. 7 is a top view of the backplate of FIG. 2.

As better seen in FIGS. 5 and 6, the flange 30 includes many cylindrical cells 41, 42 extending parallel to the main axis A of the flange 30. The arch 35 includes a first set of cells 41 organized symmetrically with respect to the main axis A. Particularly, the walls 41a separating these cells 41 extend either radially with respect to the main axis A or along curves centered on the main axis A and preferably substantially circumferential with respect to the main axis A. These cells 41 are open on the external surface of the arch 35 and closed at the groove 36. In addition, the corners of these cells 41 are rounded, a fillet being provided between each side wall of the cells 41, so as to facilitate the passage and the orientation of the reinforcing fibers in the flange 30 during the injection.

Each retaining tab 31 also includes a second set of cells 42 organized symmetrically with respect to the axis C of the bore 33 of the considered retaining tab 31. Particularly, the walls 42a separating these cells 42 extend radially with respect to the axis C of the bore 33. These cells 42 are open on the abutment surface 32 of the retaining tab 31 and closed at its opposite surface. Here again, the corners of these cells 42 are rounded, a fillet being provided between each side wall of the cells 42.

The backplate 70 for its part has a general shape of a plate with a planar upper face 71 and a planar lower face 72 that are connected by a peripheral side wall 73. The backplate 70 is also symmetrical with respect to the main axis A of the bearing 20. More specifically, the dimensions of the backplate 70 correspond to the external dimensions of the flange 30 so that the backplate 70 may be mounted on the abutment surface 32 of the flange 30 by accurately extending the contours of the flange 30.

In the present example, the backplate 70 is essentially planar; however, in other examples, it may have other shapes, for example a cradle shape depending on the shape of the flange and/or the chassis of the vehicle.

More particularly, the backplate has an obturation portion 76 framed by two assembly portions 77: each assembly portion 77 is provided to coincide with a retaining tab 31 of the flange 30 while the obturation portion 76 is provided to span the groove 36 of the flange 30 and thus close it.

Each assembly portion 77 includes a bore 74 coincident with the fastening bore 33 of the corresponding retaining tab 31 of the flange 30: its diameter corresponds substantially, that is to say within a clearance, to the external diameter of the sleeve 34 so that the portion of the sleeve 34 protruding from the abutment surface 32 of the flange 30 may be engaged in this bore 74.

In addition, each assembly portion 77 includes two apertures 88 provided internally, in the vicinity of the upper face 72 of the backplate 70, with a shoulder 89 directed towards the lower face 71 of the backplate 70. Furthermore, an inclined surface 79a is provided at the inlet of each aperture 88, on the back of the shoulder 89.

The backplate 70 is made by glass fiber-reinforced polyamide molding and injection 66. The glass fibers used to reinforce the polyamide of the backplate 70 are similar to those used for the flange 30.

Figure 8:
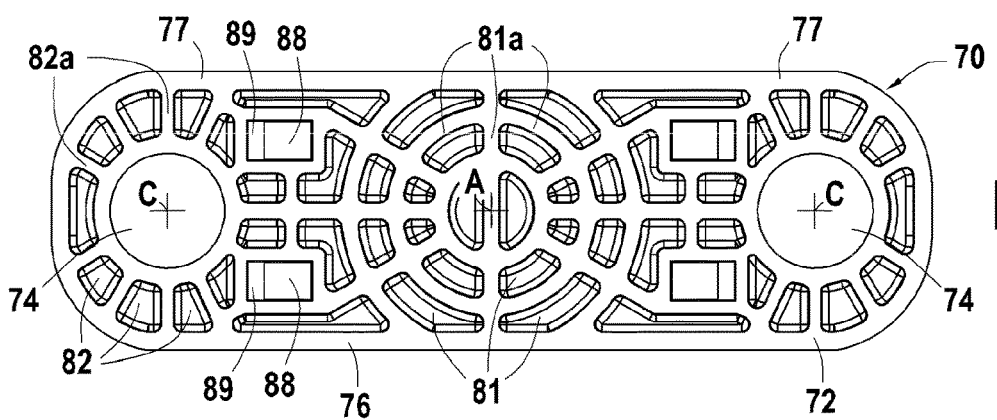
FIG. 8 is a bottom view of the backplate of FIG. 2.

As better seen in FIG. 8, the backplate 70 includes many cylindrical cells 81, 82 extending parallel to the main axis A of the backplate 70 and of the bearing 20.

The obturation portion 76 includes a first set of cells 81 organized symmetrically with respect to the main axis A. Particularly, the walls 81a separating these cells 81 extend either radially with respect to the main axis A, namely along curves centered on the main axis A and preferably substantially circumferential with respect to the main axis A. These cells 81 are open on the lower surface 72 of the backplate 70 and closed at its upper surface 71. In addition, the corners of these cells 81 are rounded, a fillet being provided between each side wall of the cells 81, so as to facilitate the passage and the orientation of the reinforcing fibers in the backplate 70 during the injection.

Each assembly portion 77 also includes a second set of cells 82 organized symmetrically with respect to the axis C of the bore 74 of the considered assembly portion 77. Particularly, the walls 82a separating these cells 82 extend radially with respect to the axis C of the bore 74. Here again, these cells 82 are open on the lower surface 72 of the backplate 70 and closed at its upper surface 71. In addition, the corners of these cells 82 are also rounded, a fillet being provided between each side wall of the cells 82.

The stabilizer unit 1 is then assembled in the following manner. Once the flange 30 and the backplate 70 are manufactured by molding and injection, the flange 30 is passed around the stabilizer bar 10. It is noted in FIGS. 2 to 4 that the section 13 of the stabilizer bar 10 is received entirely in the groove 36 of the flange 10, that is to say that the groove 36 completely surrounds the stabilizer bar 10.

The stabilizer bar 10 may have undergone a preparation treatment. Particularly, the stabilizer bar 10 may have undergone a flame treatment step during which the area(s) which are to receive the bearing 20 are heated locally for about 6 s using a torch flame, for example a gas, propane, butane or acetylene torch to mention a few examples. During this flame treatment step, the bar is turned around its axis, for example by hand.

This unit is then placed in a mold so that the stabilizer bar 10 extends within the flange 30 along the axis B, leaving a continuous and constant clearance between the stabilizer bar 10 and the cradle portion 37 of the flange 30.

Rubber is then injected into the mold so as to fill the space in the groove 36 left all around the stabilizer bar 10, from the cradle portion 37 of the flange 30 until the opening of the groove 36, thus forming the elastomer layer 59. The elastomer layer 59 thus obtained is then vulcanized so as to secure the stabilizer bar 10 within the flange 30.

Then, the backplate 70 is mounted on the abutment surface 32 of the flange 30. On this occasion, the protruding portions of the sleeves 34 allow correctly positioning and aligning the backplate 70 by press-fitting the bores 74 of the backplate around the sleeves 34 of the flange 30. Particularly, it is noted in FIGS. 2 to 3 that the backplate 70 closes the groove 36 of the flange 30 in the plane of the abutment surface 32, that is to say without entering the groove 36.

This alignment being carried out, the elastic tabs 49 of the flange 30 are automatically facing the apertures 88 of the backplate 70, the insertion surface 79a of the elastic tabs 49 opposite the inclined surface 89a of the considered aperture 88. Therefore, a pressure on the backplate 70, using a press for example, allows the elastic tabs 49 to be deformed, the insertion surfaces 49a sliding on the inclined surfaces 79a, until the blocking surface 49b of each tab 49 is engaged behind the shoulder 89 of each aperture 88, thus blocking the backplate 70 against the abutment surface 32 of the flange 30, and thus ensuring a compression of the elastomer layer 59. Consequently, it is noted that the elastomer layer 59 is integrally contained in the groove 36 of the flange 30.

However, in other examples, the elastic tabs 49 could be 1 or 2 mm longer so that a 1 or 2 mm clearance may remain between the backplate 70 and the abutment surface 32 of the flange, thus only partially compressing the elastomer layer 59, at least until screws are engaged and tightened in the bores 33 and 74.

The bearing 20 is thus assembled and the same operation may be carried out for the second bearing 20. Alternatively, the two bearings may be assembled simultaneously.

The stabilizer unit 1 thus assembled may then be mounted on the chassis of the vehicle by pressing the lower surface 72 of the bearing 10 on the chassis and by screwing the bearing 20 on the chassis using two screws passing through the bores 33 and 74 of the retaining tabs 32 of the flange 30 and the assembly portions 77 of the backplate 70.

Although the present disclosure has been described with reference to specific exemplary embodiments, it is obvious that modifications and changes may be made to these examples without departing from the general scope of the disclosure as defined by the claims. Particularly, individual characteristics of the various illustrated/mentioned embodiments may be combined in additional embodiments. Consequently, the description and the drawings should be considered in an illustrative rather than restrictive sense.

It is also obvious that all the characteristics described with reference to one method may be transposed, alone or in combination, to one device, and conversely, all the characteristics described with reference to one device may be transposed, alone or in combination, to one method.

The invention claimed is:

1. A bearing for a stabilizer bar of a vehicle, comprising:
a flange including at least one retaining portion, provided with a fastening bore, and one groove, configured to receive the stabilizer bar, and
a backplate including at least one obturation portion, the backplate being provided to be mounted on the flange so that the obturation portion closes the groove of the flange,
wherein the backplate is mounted on an abutment surface of said at least one retaining portion, and
wherein the flange and the backplate have elastic nesting members configured to secure the backplate on the flange, and
wherein the backplate includes a planar upper face extending throughout the backplate.

2. The bearing according to claim 1, wherein the elastic nesting members are irreversible.

3. The bearing according to claim 1, wherein the elastic nesting members comprise at least one elastic tab, extending from a retaining portion of the flange, and one corresponding shoulder, provided in an assembly portion of the backplate, the elastic tab being configured to be engaged and retained behind the corresponding shoulder.

4. The bearing according to claim 1, wherein the flange and the backplate have positioning members configured to position the backplate relative to the flange.

5. The bearing according to claim 1, wherein at least one retaining portion of the flange is provided with a fastening bore, and
wherein the backplate comprises an assembly portion provided with a bore coincident with the fastening bore of a retaining portion of the flange.

6. The bearing according to claim 5, wherein the fastening bore of at least one retaining portion of the flange is provided with a metal sleeve, and
wherein the metal sleeve of one at least of the retaining portions of the flange protrudes from the abutment surface of the retaining portion so as to be engaged in the bore of the corresponding assembly portion of the backplate.

7. The bearing according to claim 1, wherein the flange and/or the backplate is made of plastic material, aluminum or aluminum alloy.

8. The bearing according to claim 1, comprising an elastomer layer provided within the groove of the flange and intended to surround the stabilizer bar.

9. The bearing according to claim 1, wherein the flange and/or the backplate has a cellular structure.

10. The bearing according to claim 9, wherein the cells of the backplate are parallel and extend along a main axis of the backplate orthogonal to a direction of extension of the stabilizer bar, and
wherein at least some walls separating the cells of the backplate extend in substantially radial and/or tangential planes with respect to the main axis of the backplate.

11. A stabilizer unit for a vehicle, comprising:
a stabilizer bar, and
at least one bearing according to claim 1, mounted on the stabilizer bar.

12. The bearing according to claim 1, wherein there is no protrusion of elements on the backplate.

13. The bearing according to claim 1, wherein the elastic nesting members are configured to allow a clearance between the backplate and the flange.

* * * * *